United States Patent Office 2,770,115
Patented Nov. 13, 1956

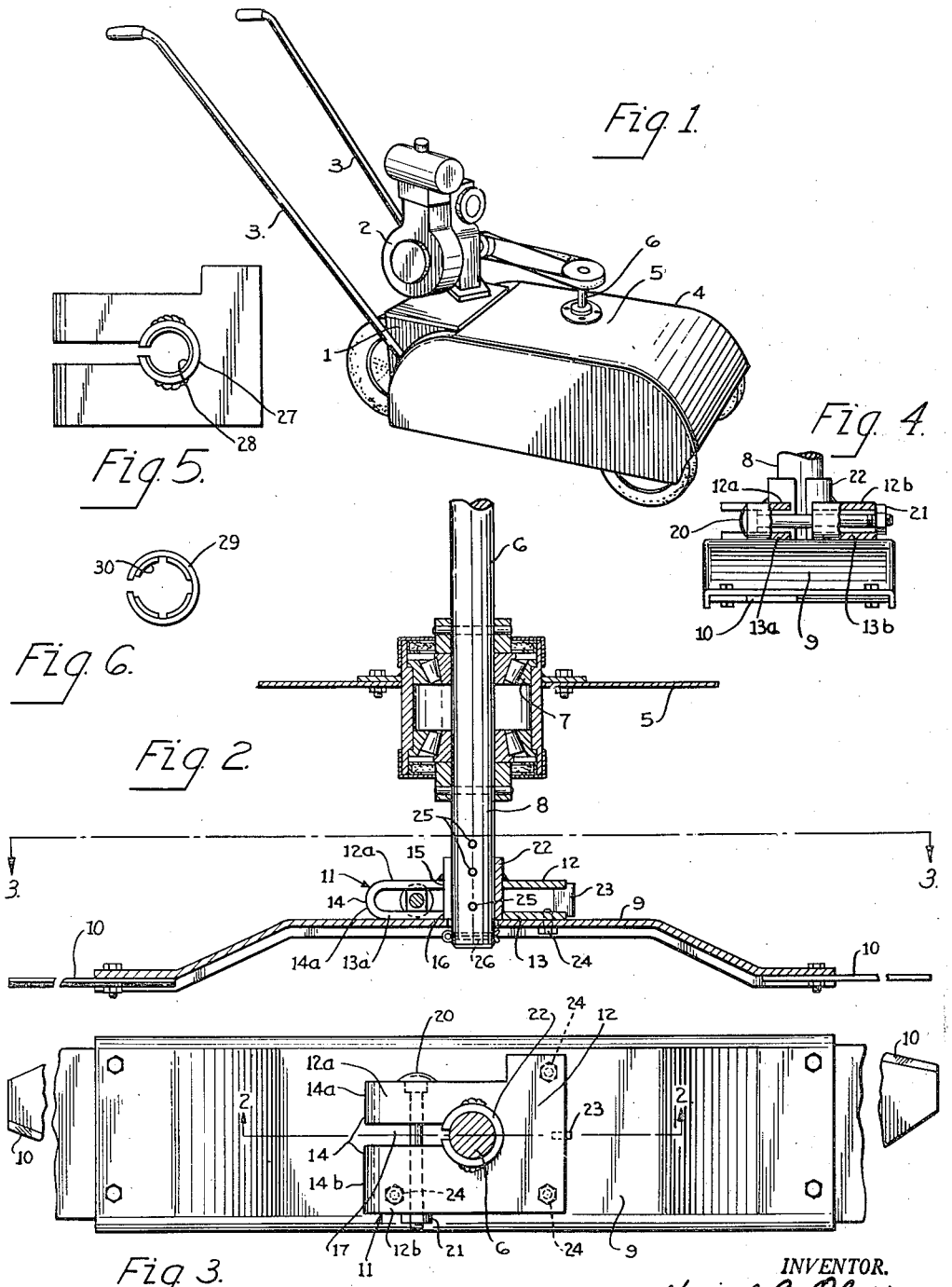

2,770,115

OVERLOAD RELEASE FRICTION COUPLING

Howard C. Ober, Lyndhurst, Ohio

Application August 14, 1953, Serial No. 374,174

3 Claims. (Cl. 64—30)

This invention relates to a connector for connecting an element and rotatable shaft for rotation together, and particularly to a safety slip connector for connecting a rotary element to a supporting and driving shaft.

For the purposes of illustration, a preferred embodiment of the invention will be described in connection with a lawn mower of the type employing a vertical supporting and driving shaft and a horizontal cutter bar which is secured to the shaft for rotation thereby in a path parallel to the ground surface.

Generally, the invention comprises a clamping device which is detachably secured to the element to be fastened to the shaft and which is adapted to receive the shaft endwise and to be drawn tightly into clamping engagement therewith so as to secure the element and shaft for rotation together, the clamping jaw portion of the device being of a metal which is softer than the metal of the shaft so that, in the event of the element being prevented by extraneous force from being rotated with the shaft, the shaft can slip relative thereto without being scored or damaged by the clamping means.

A more specific feature of the invention resides in the simplified structure by which such a clamping means is provided, this structure, in its preferred specific form, being a flat strap of metal which is bent flatwise between its ends to provide a base and a pair of spaced legs extending therefrom, the legs having aligned passages therethrough, respectively, in which is accommodated clamping jaw means in the form of a split sleeve which is secured to at least one of the legs and has its split side facing toward the base, the legs and base being bifurcated with a slot which extends from the base to the passages and thus divides the legs into pairs of arms spaced apart at opposite sides of the slot and which pairs can be drawn toward each other for contracting the split sleeve into clamping engagement with the shaft received therein.

For the purposes of illustration, the invention will be described entirely as applied to a mowing machine, its use in connection with other types of equipment being readily apparent from the illustrative example.

Various objects and advantages of the invention will become apparent from the following description in which reference is made to the drawings, in which Figure 1 is a perspective view illustrating a type of lawn mower in connection with which the invention is used;

Figure 2 is an enlarged fragmentary sectional view of a portion of the machine shown in Figure 1, illustrating the driving shaft thereof and its mounting and the connection of the cutter bar to the shaft by means of the present invention, and is taken on line 2—2 of Figure 3;

Figure 3 is a horizontal sectional view taken on the line 3—3 of Figure 2;

Figure 4 is a left end elevation, partly in section, of the structure illustrated in Figures 2 and 3;

Figures 5 and 6 are plan views illustrating modifications, respectively, of the connector.

Referring first to Figure 1, there is shown a lawn mower comprising a wheeled carriage 1 on which is mounted the usual gasoline motor 2 and which is provided with handlebars 3.

Mounted on the front of the carriage 1 is a cutter support 4 through the top wall 5 of which extends a main driving shaft 6 for the cutter bar, the shaft 6 being connected by the usual belt and pulleys to the engine 2, as illustrated.

In mowers of this type, it is desirable to mount the shaft in anti-friction bearings. This mounting is made by the factory as a permanent and tamper-proof mounting because of the fact that the conditions under which a mower operates requires a careful packing and alignment of the bearings. Accordingly, the shaft is mounted to extend a fixed distance below the bearings rather than being mounted for endwise adjustment.

As illustrated in Figure 2, the anti-friction bearing, indicated at 7, is fixedly secured to the wall 5 and the shaft 6 is secured fixedly in the bearings with a depending portion 8 extending therebeneath.

Mounted on the portion 8 of the shaft 6 is a horizontal cutter bar 9 which is provided at its ends with suitable cutting blades 10.

Since the shaft 6 is fixed in position axially and no adjustment of the cutter bar for different distances above the ground for different depth of cut is possible by movement of the shaft, means must be provided for connecting the cutter bar to the shaft in different adjusted positions along the lower portion 8 of the shaft so as to obtain different depths of cutting.

Furthermore, since such cutter bars operate at relatively high rotational speed and often strike stones, protruding roots and the like which abruptly stop their rotation, it is desirable that the connection between the cutter bar and the shaft be such that both the shaft and cutter bar are protected in event of the cutter bar striking such obstructions.

In accordance with the present invention, a connector is provided by which the cutter bar 9 can be connected to the shaft at any desired adjusted position along the length of the lower portion 8 thereof and which, at the same time, provides a connection permitting the shaft to continue rotating even though the rotation of the cutter bar is arrested by some obstruction or other, thus protecting both the cutter bar and the shaft from damage due to excessive shocks, deflections, and the like. By means of the same connector, the shaft is protected against scoring due to any rotation in and relative to the connecting means.

Referring particularly to Figures 2 through 4, a preferred embodiment of the connecting means is illustrated and comprises a single length of strap metal, indicated generally at 11, which is bent flatwise between its ends to provide elongated and relatively wide legs 12 and 13 joined together by means of an intermediate portion or base 14 and disposed in face to face, and preferably parallel relation to each other.

The legs 12 and 13 are provided with passages 15 and 16, respectively, these passages being generally aligned with each other.

The legs 12 and 13 and the base 14 are bifurcated by a slot 17 which extends from the passages 15 and 16, entirely through the base 14 of the U-shaped strap of metal. This bifurcation divides the legs into pairs of arms, these pairs being spaced apart edgewise from each other. One pair of arms comprises an upper arm 12a and a lower arm 13a joined by an intermediate portion 14a, and the other pair comprises an upper arm 12b and a lower arm 13b joined by an intermediate portion 14b.

The pairs of arms can be moved relatively toward each other edgewise by edgewise flexure of the metal of the strap. Suitable means for this purpose are provided and in the form illustrated may be a bolt 20 and nut 21, the bolt having a head engaging the outer edge of one pair of arms and extending between the arms across the slot 17 beyond the outer edge of the other pair of arms, the nut being provided on the outer edge of the bolt and engaging the outer edge of the said other pair of arms.

The legs are provided with clamping jaws which, in the form illustrated, preferably are in the form of a split sleeve 22 which bridges the space between the legs 12 and 13 and preferably extends into the passages 15 and 16—at least the bore of the sleeve is aligned with the passages 15 and 16 so that the lower end 8 of the shaft can be inserted between the clamping portions axially of the shaft. The sleeve preferably extends at its lower end into the passage 16, and, at its upper end, extends through the passage 15 a short distance above the upper level of the leg 12. The clamping means or sleeve is secured fixedly to at least one of the legs. In the form illustrated, it is shown as secured by welding to the upper leg 12. The sleeve is positioned in a rotated position relative to the legs so that its slotted side faces toward the base 14 of the U-shaped strap.

The opposite ends of the legs 12 and 13 preferably are secured in fixed position in a direction endwise of the shaft by means of a suitable filler 23 which is welded to both the upper and lower legs, preferably at the free end thereof.

Suitable means are provided for connecting the connector to an element to be connected to the shaft. In the form illustrated, this is accomplished by means of suitable bolts 24 which extend through the cutter bar 9 and are in threaded engagement with suitable bores in the lower leg 13. The bolts 24 are arranged so that they are spaced a considerable distance from the axis of the sleeve 22.

It is to be noted that while the U-shaped strap is to be connected securely to the cutter bar at widely spaced positions on the leg 13 that only one of the pairs of arms is to be secured in fixed position relative to the cutter bar. Thus, the arm 13b is secured fixedly in position and the arm 13a is left free and unconstrained by the securing means for movement edgewise toward the arm 13b.

As mentioned, it is desirable that the jaws, which in the preferred form are those portions of the sleeve which engage the shaft, be of metal which is softer than the shaft so that if the shaft is rotated in the sleeve while the sleeve is clamped thereto, the shaft will not be scored by the metal of the sleeve. The shaft may be of any good quality steel or alloy depending on the rigidity and strength required. Any metal of suitable strength which is softer than the shaft may be used, a copper-iron alloy being preferred due to its substantial strength and its reduced hardness relative to the hardness of the shaft 6.

In the form illustrated, in Figures 1 through 3, the sleeve which provides the clamping portions is shown as a unitary sleeve composed of the same metal throughout and, for convenience in manufacture and advantages in operation, this is preferred.

A series of apertures 25 may be provided in the shaft near the upper and lower ends of the portion 8 and a split key 26 inserted in a selected one of them for assuring that the cutter bar cannot slide off of the shaft in event it is loosened by relative rotation of the shaft and cutter bar.

However, the sleeve may be of hard metal lined with softer metal. Such a sleeve is indicated at 27 in Figure 5, the sleeve having an inner lining 28 of metal which is soft relative to the shaft, the inner lining preferably being bonded to the outer retaining portion of the sleeve.

Again, a plurality of separate jaws may be provided for clamping, these jaws being supported for movement into and out of clamping relation with respect to the shaft. Such a clamp is illustrated in Figure 6 in which a suitable retainer 29 supports a plurality of soft metal jaws 30 for movement into and out of clamping engagement with respect to the shaft.

It is apparent from the foregoing description that the present invention provides a relatively simple structure which can readily be operated for clamping the cutter bar to the shaft in whatever adjusted position is desired lengthwise of the shaft. Further, the clamping device can readily be attached to the cutter bar, or to such other element as is to be connected to the shaft, so as to be replaceable readily, if damaged. Again, the device makes possible a simple clamping engagement such that the shaft can slip and continue to rotate even though the cutter bar is stopped completely, thus protecting the cutter bar. Finally, relative rotation between the shaft and the cutter bar resulting from extraneous circumstances does not score or damage the shaft in any manner.

Under such circumstances, since the shaft 6 is protected in such a manner, the likelihood of damage to the shaft which would necessitate its replacement or readjustment and alignment is eliminated.

Having thus described my invention, I claim:

1. In a device including a shaft member having a peripheral wall, bearing means supporting the shaft member for rotation about its axis, a second member, a clamp on the second member and having wall portions normally in tight clamping engagement with the peripheral wall of the shaft member and thereby drivingly connecting the members for rotation together about said axis, and power means drivingly connected to one of the members and operative to rotate the members at relatively high speed, said clamp being characterized in that those of its said wall portions which are in clamping engagement with said peripheral wall are composed of bearing metal which is sufficiently softer than the peripheral wall so that the bearing metal cannot score the peripheral wall due to rotation of the said one of the members relative to the other of said members occasioned by instantaneous stopping of the said other of the members while said wall portions are in their normally tight clamping relation.

2. The structure according to claim 1 further characterized in that said clamp includes a sleeve which is coaxial with the shaft member and has a slit extending generally longitudinally so that it can be contracted radially, and said wall portions are at least part of the interior wall of the sleeve.

3. The structure according to claim 1 further characterized in that said shaft member is steel and said metal is copper-iron alloy.

References Cited in the file of this patent
UNITED STATES PATENTS

| | | |
|---|---|---|
| 2,433,791 | Smith | Dec. 30, 1947 |
| 2,471,367 | Cavaness | May 24, 1949 |
| 2,472,925 | Spase | June 14, 1949 |
| 2,569,144 | Benson | Sept. 25, 1951 |
| 2,657,517 | Berdan | Nov. 3, 1953 |